US 12,505,526 B2

(12) United States Patent
Sohn et al.

(10) Patent No.: US 12,505,526 B2
(45) Date of Patent: Dec. 23, 2025

(54) CLUSTERING IMAGES FOR ANOMALY DETECTION

(71) Applicant: Google LLC, Mountain View, CA (US)

(72) Inventors: Kihyuk Sohn, Mountain View, CA (US); Jinsung Yoon, San Jose, CA (US); Chun-Liang Li, Mountain View, CA (US); Tomas Jon Pfister, Foster City, CA (US); Chen-Yu Lee, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 459 days.

(21) Appl. No.: 18/054,524

(22) Filed: Nov. 10, 2022

(65) Prior Publication Data

US 2023/0153980 A1 May 18, 2023

Related U.S. Application Data

(60) Provisional application No. 63/263,979, filed on Nov. 12, 2021.

(51) Int. Cl.
*G06V 10/00* (2022.01)
*G06T 7/00* (2017.01)
(Continued)

(52) U.S. Cl.
CPC ........ *G06T 7/0004* (2013.01); *G06V 10/7625* (2022.01); *G06V 10/7635* (2022.01);
(Continued)

(58) Field of Classification Search
CPC ............ G06N 3/02; G06N 3/08; G06N 3/042; G06N 3/045; G06N 3/047; G06N 3/082;
(Continued)

(56) References Cited

U.S. PATENT DOCUMENTS 6,071,317 A * 6/2000 Nagel ...................... G06F 8/78
717/131
6,106,466 A * 8/2000 Sheehan ................ A61B 5/062
600/443

(Continued)

FOREIGN PATENT DOCUMENTS

WO 2018125932 A1 7/2018

OTHER PUBLICATIONS

International Preliminary Report on Patentability for Application No. PCT/US2022/079674, mailed May 23, 2024, 11 pages.
(Continued)

*Primary Examiner* — Amir Alavi
(74) *Attorney, Agent, or Firm* — DORITY & MANNING, P.A.

(57) ABSTRACT

A computer-implemented method includes receiving an anomaly clustering request that requests data processing hardware to assign each image of a plurality of images into one of a plurality of groups. The method also includes obtaining a plurality of images. For each respective image, the method includes extracting a respective set of patch embeddings from the respective image, determining a distance between the respective set of patch embeddings and each other set of patch embeddings, and assigning the respective image into one of the plurality of groups using the distances between the respective set of patch embeddings and each other set of patch embeddings.

18 Claims, 6 Drawing Sheets

(51) Int. Cl.
*G06V 10/762* (2022.01)
*G06V 10/764* (2022.01)
*G06V 10/82* (2022.01)

(52) U.S. Cl.
CPC .............. *G06T 2207/20081* (2013.01); *G06T 2207/20084* (2013.01); *G06V 10/764* (2022.01); *G06V 10/82* (2022.01)

(58) Field of Classification Search
CPC ...... G06N 3/088; G06N 3/092; G06N 3/0475; G06N 3/0464; G06N 3/0454; G06N 3/0895; G06N 3/0455; G06V 10/82; G06V 10/761; G06V 10/454; G06V 10/50; G06V 10/7625; G06V 10/7635; G06V 10/764; G06F 18/2155; G06T 2207/20081; G06T 2207/20084
See application file for complete search history.

(56) References Cited

U.S. PATENT DOCUMENTS

| | | | | |
|---|---|---|---|---|
| 6,301,496 | B1* | 10/2001 | Reisfeld | A61B 5/287 600/407 |
| 10,621,420 | B2* | 4/2020 | Philbin | G06N 3/0464 |
| 10,832,062 | B1* | 11/2020 | Evans | G06V 10/761 |
| 11,580,135 | B2* | 2/2023 | Wan | G06F 16/353 |
| 2003/0053667 | A1* | 3/2003 | Paragios | G06T 7/12 382/128 |
| 2008/0263042 | A1 | 10/2008 | Li et al. | |
| 2022/0383128 | A1* | 12/2022 | Gonzales | G06V 10/764 |
| 2023/0025826 | A1* | 1/2023 | Taslakian | G06N 3/042 |
| 2023/0153980 | A1* | 5/2023 | Sohn | G06N 3/0895 382/141 |
| 2023/0252478 | A1* | 8/2023 | Saleh | G06Q 20/4016 705/44 |
| 2023/0351572 | A1* | 11/2023 | Qiu | G06N 3/042 |

OTHER PUBLICATIONS

International Search Report and Written Opinion for the related Application No. PCT/US2022/079674, dated Mar. 2, 2023, 183 pages.
Janarthan Sivasubramaniam et al: Metric Learning Based Citrus Disease Classification With Sparse Data, IEEE Access, IEEE, USA, vol. 8, Sep. 3, 2020 (Sep. 3, 2020), pp. 162588-162600, XP011809117, DOI: 10.1109/ACCESS.2020.3021487, [retrieved on Sep. 14, 2020] abstract, figure 1, p. 162590, col. 1, paragraph 4-col. 2, paragraph 4, p. 162592, col. 2, paragraph 6—13 pages.
Stanislav Fort et al: "Exploring the Limits of Out-of-Distribution Detection", arxiv .org, Cornell University Library, 201, Olin Library Cornell University Ithaca, NY 14853, Jul. 27, 2021 (Jul. 27, 2021), XP091004929, the whole document, 21 pages.
Karsten Roth et al: "Towards Total Recall in Industrial Anomaly Detection", arxiv.org, Cornell University Library, 201 Olin Library Cornell University Ithaca, NY 14853, Jun. 15, 2021 (Jun. 15, 2021), XP081989906, the whole document, 18 pages.
Kihyuk Sohn et al: "Anomaly Clustering: Grouping Images into Coherent Clusters of Anomaly Types", arxiv.org, Cornell University Library, 201 Olin Library Cornell University Ithaca, NY 14853, Dec. 21, 2021 (Dec. 21, 2021), XP091118529, the whole document, 17 pages.

* cited by examiner

CLUSTERING IMAGES FOR ANOMALY DETECTION

CROSS REFERENCE TO RELATED APPLICATIONS

This U.S. patent application claims priority under 35 U.S.C. § 119(e) to U.S. Provisional Application 63/263,979, filed on Nov. 12, 2021. The disclosure of this prior application is considered part of the disclosure of this application and is hereby incorporated by reference in its entirety.

TECHNICAL FIELD

This disclosure relates to clustering images for anomaly detection.

BACKGROUND

Anomaly detection aims to identify anomalous data from normal data (e.g., non-anomalous data). There is oftentimes a scarce amount of labeled anomalous data available to train anomaly detection models. Thus, at inference these anomaly detection models are limited to a binary output of either an anomalous or a non-anomalous classification. Importantly, there are numerous different types of anomalous data and simply classifying data as anomalous or non-anomalous fails to provide any meaningful insights about the different types of anomalous data occurring in a particular data set. In some instances, users may only be interested in a particular type of anomaly whereby these users may be required to manually sort through all the data identified as anomalous by anomalous detection models to isolate the particular type of anomalous data of interest.

SUMMARY

One aspect of the disclosure provides a computer-implemented method that when executed on data processing hardware causes the data processing hardware to perform operations for clustering images for anomaly detection. The operations include receiving an anomaly clustering request that requests the data processing hardware to assign each image of a plurality of images into one of a plurality of groups and obtaining the plurality of images. For each respective image of the plurality of images, the operations also include: extracting a respective set of patch embeddings from the respective image using a trained model; determining a distance between the respective set of patch embeddings and each other set of patch embeddings; and assigning, using the distances between the respective set of patch embeddings and each other set of patch embeddings, the respective image into one of the plurality of groups.

Implementations of the disclosure may include one or more of the following optional features. In some implementations, assigning the respective image into one of the plurality of groups includes applying a distance-based clustering technique. In these implementations, the distance-based clustering technique includes one of hierarchical clustering or spectral clustering. In some examples, each image of the plurality of images is unlabeled or unlabeled. The operations may further include determining a weight vector for the respective set of patch embeddings where the weight vector includes a weight for each patch embedding in the respective set of patch embeddings. Here, each weight indicates a likelihood that the patch embedding includes an anomaly. Determining the distance between the respective set of patch embeddings and each other set of patch embeddings includes determining a weighted average distance between each set of patch embeddings using the weight vectors corresponding to the respective set of patch embeddings and each other set of patch embeddings.

In some implementations, the distance between the respective set of patch embeddings and each other set of patch embeddings includes a Euclidean distance. In some examples, determining the distance between the respective set of patch embeddings includes using an unsupervised model. In other examples, determining the distance between the respective set of patch embeddings includes using a semi-supervised model. The plurality of groups includes at least one of a normalcy group representing images without any anomalies, a first anomaly group representing images that include a first manufacturing defect, and a second anomaly group representing images that include a second manufacturing defect.

Another aspect of the disclosure provides a system that includes data processing hardware and memory hardware storing instructions that when executed on the data processing hardware causes the data processing hardware to perform operations. The operations include receiving an anomaly clustering request that requests the data processing hardware to assign each image of a plurality of images into one of a plurality of groups and obtaining the plurality of images. For each respective image of the plurality of images, the operations also include: extracting a respective set of patch embeddings from the respective image using a trained model; determining a distance between the respective set of patch embeddings and each other set of patch embeddings; and assigning, using the distances between the respective set of patch embeddings and each other set of patch embeddings, the respective image into one of the plurality of groups.

Implementations of the disclosure may include one or more of the following optional features. In some implementations, assigning the respective image into one of the plurality of groups includes applying a distance-based clustering technique. In these implementations, the distance-based clustering technique includes one of hierarchical clustering or spectral clustering. In some examples, each image of the plurality of images is unlabeled or unlabeled. The operations may further include determining a weight vector for the respective set of patch embeddings where the weight vector includes a weight for each patch embedding in the respective set of patch embeddings. Here, each weight indicates a likelihood that the patch embedding includes an anomaly. Determining the distance between the respective set of patch embeddings and each other set of patch embeddings includes determining a weighted average distance between each set of patch embeddings using the weight vectors corresponding to the respective set of patch embeddings and each other set of patch embeddings.

In some implementations, the distance between the respective set of patch embeddings and each other set of patch embeddings includes a Euclidean distance. In some examples, determining the distance between the respective set of patch embeddings includes using an unsupervised model. In other examples, determining the distance between the respective set of patch embeddings includes using a semi-supervised model. The plurality of groups includes at least one of a normalcy group representing images without any anomalies, a first anomaly group representing images that include a first manufacturing defect, and a second anomaly group representing images that include a second manufacturing defect.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Conventional anomaly detection models output classification labels in a binary fashion. That is, the output classification labels include a normalcy label indicating that data corresponds to non-anomalous data and an anomalous label indicating that data corresponds to anomalous data. However, simply having binary classification outputs (e.g., normalcy or anomalous) fails to provide meaningful insights about different types of anomalous data. For example, some anomaly detection models may classify images of manufactured cables with an anomalous label when any manufacturing defect is present including a bent wire, cut inner insulation, cut outer insulation, missing cable, among other defects. Notably, even though there are several types of different defects, conventional anomaly detection models simply classify each image with a normalcy label or anomalous label without classifying any sub-labels corresponding to different types of anomalies.

Differentiating between different types anomalies would provide several significant benefits. For instance, differentiating between different types of anomalous data may allow a user to curate a training data set for a particular defect type. Here, the training data set may be subsequently used to train a neural network model to detect the particular defect type. In other instances, classifying sub-labels of anomalous data may assist users to root cause an issue causing a particular type of anomaly without having to sort through other sub-labels of anomalous data classified by the model.

Accordingly, implementations herein are directed towards methods and systems of clustering images for anomaly detection. More specifically, an image clustering anomaly detector may receive an anomaly clustering request to assign each image of a plurality of images into one of a plurality of groups. The plurality of groups include a group for each anomaly type associated with the plurality of images and a group associated with a normalcy (e.g., non-anomalous) image. For each respective image, the image clustering anomaly detector extracts a respective set of patch embeddings from the respective image and determines a distance between the respective set of patch embeddings and each other set of patch embeddings for the other images. As will become apparent, the distance may include an average weighted distance based on a weight vector associated with the respective set of patch embeddings. Using the distance, the image clustering anomaly detector assigns the respective image into one of the plurality of anomaly groups.

Figure 1:
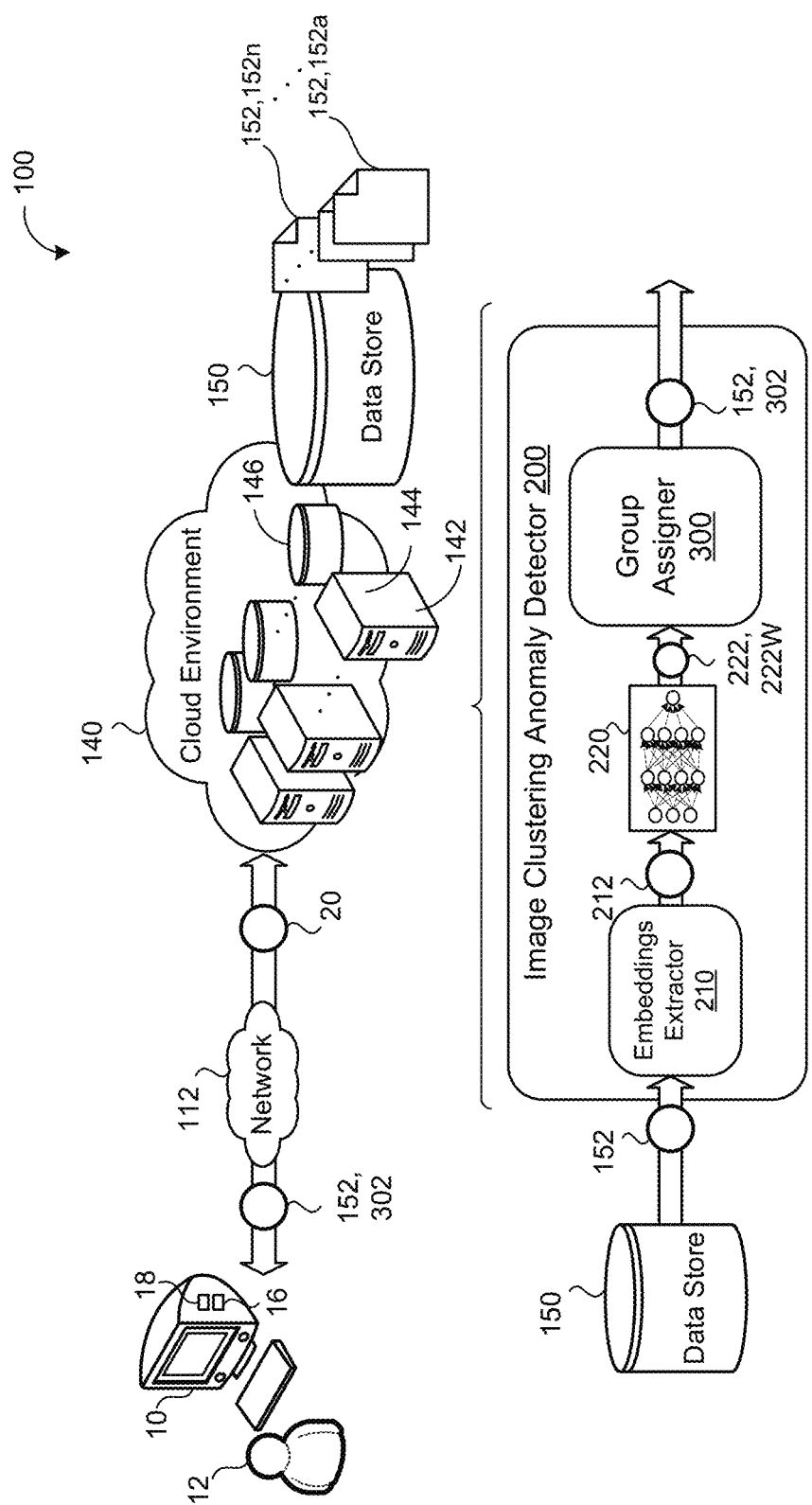
FIG. 1 is a schematic view of an example system for detecting anomalies in images.

Referring now to FIG. 1, in some implementations, an example image clustering anomaly detection system 100 includes a cloud computing environment 140 in communication with one or more user devices 10 via a network 112. The cloud computing environment 140 may be a single computer, multiple computers, or a distributed system having scalable/elastic resources 142 including computing resources 144 (e.g., data processing hardware) and/or storage resources 146 (e.g., memory hardware). A data store 150 (i.e., a remote storage device) may be overlain on the storage resources 146 to allow scalable use of the storage resources 146 by one or more of the clients (e.g., the user device 10) or the computing resources 144. The data store 150 is configured to store a plurality of images 152, 152*a-n*.

The cloud computing environment 140 is configured to receive an anomaly clustering request 20 from the user device 10 associated with a respective user 12 via, for example, the network 112. The user device 10 may correspond to any computing device, such as a desktop workstation, a laptop workstation, or a mobile device (i.e., a smart phone). The user device 10 includes computing resources 18 (e.g., data processing hardware) and/or storage resources 16 (e.g., memory hardware). The anomaly clustering request 20 requests the cloud computing environment 140 to determine or detect a presence of anomalies in a plurality of images 152 and to assign each respective image 152 into one of a plurality of anomaly groups 302.

The cloud computing environment 140 executes an image clustering anomaly detector 200 for detecting anomalies (e.g., defects) in the images 152. In some examples, the image cluster anomaly detector 200 (also referred to as simply "anomaly detector 200") may execute at the user device 10 in addition to, or in lieu of, executing at the cloud computing environment 140. The anomaly detector 200 is configured to receive the anomaly clustering request 20 from the user 12 via the user device 10. The anomaly clustering request 20 may include a set of images 152, or specify a location for the set of images 152 stored at the data store 150, for the anomaly detector 200 to classify.

In some implementations, the anomaly clustering request 20 specifies K anomaly groups 302 for the anomaly detector 200 to use during classification. For example, the user 12 may specify the plurality of anomaly groups 302 includes a respective group 302 for each anomaly including cut inner insulation, cut outer insulation, poke insulation, bent wire, cable swap, missing cable, and missing wire. In some instances, the plurality of anomaly groups 302 may include a respective group for images of normal (e.g., non-anomalous) images, and thus, the plurality of anomaly groups 302 may interchangeably be referred to as simply "the plurality of groups 302." The plurality of groups 302 may include at least one of a normalcy group 302 representing images without any anomalies, a first anomaly group 302 representing images that include a first manufacturing defect, and a second anomaly group 302 representing images that include a second manufacturing defect. For instance, the user 12 specifies that the plurality of groups 302 includes a respective group 302 for each anomaly including normal (e.g., non-anomalous data), gray stroke, rough, crack, glue strip, and oil. In other implementations, the anomaly clustering request 20 does not specify the plurality of groups 302 and the anomaly detector 200 determines the plurality of groups 302 based on processing the plurality of images 152.

The anomaly detector 200 includes an embeddings extractor 210, a neural network model 220, and a group assignor 300. The embeddings extractor 210 receives the image 152 and extracts, from each respective image 152, a respective set of patch embeddings 212 from the respective image 152. The anomaly detector 200 determines a distance 222 (e.g., a Euclidean distance) between the respective set of patch embeddings 212 and each other set of patch embeddings 212 using, for example, the neural network model 220. As described in more detail with reference to FIG. 2, the distance 222 may include a weighted average distance 222, 222W. The embeddings extractor 210 (e.g., a trained model) may include a pretrained deep neural network trained to extract the set of patch embeddings 212. Thus, the embeddings extractor 210 may include a stack of residual blocks whereby an output of a second residual block in the stack of residual blocks, followed by 3×3 average pooling and an L2 normalization layer, generates the set of patch embeddings 212. In some examples, the pretrained deep neural network of the embeddings extractor 210 includes at least one of a WideResNet-50 model, EfficientNet model, or a Vision Transformer model.

The group assignor 300 assigns each image 152 to one of the plurality of groups 302 based on the distances 222. The group assignor 300 may assign each image 152 into one of the plurality of groups 302 by applying a distance-based clustering technique including hierarchical clustering or spectral clustering. Each group 302 of the plurality of groups 302 may include any number of images 152 assigned by the group assignor 300. The anomaly detector 200 may send the plurality of images 152 and the corresponding anomaly groups 302 to the user device 10 via the network 112 or store the plurality of images 152 and the corresponding anomaly groups 302 at the data store 150.

Figure 2:
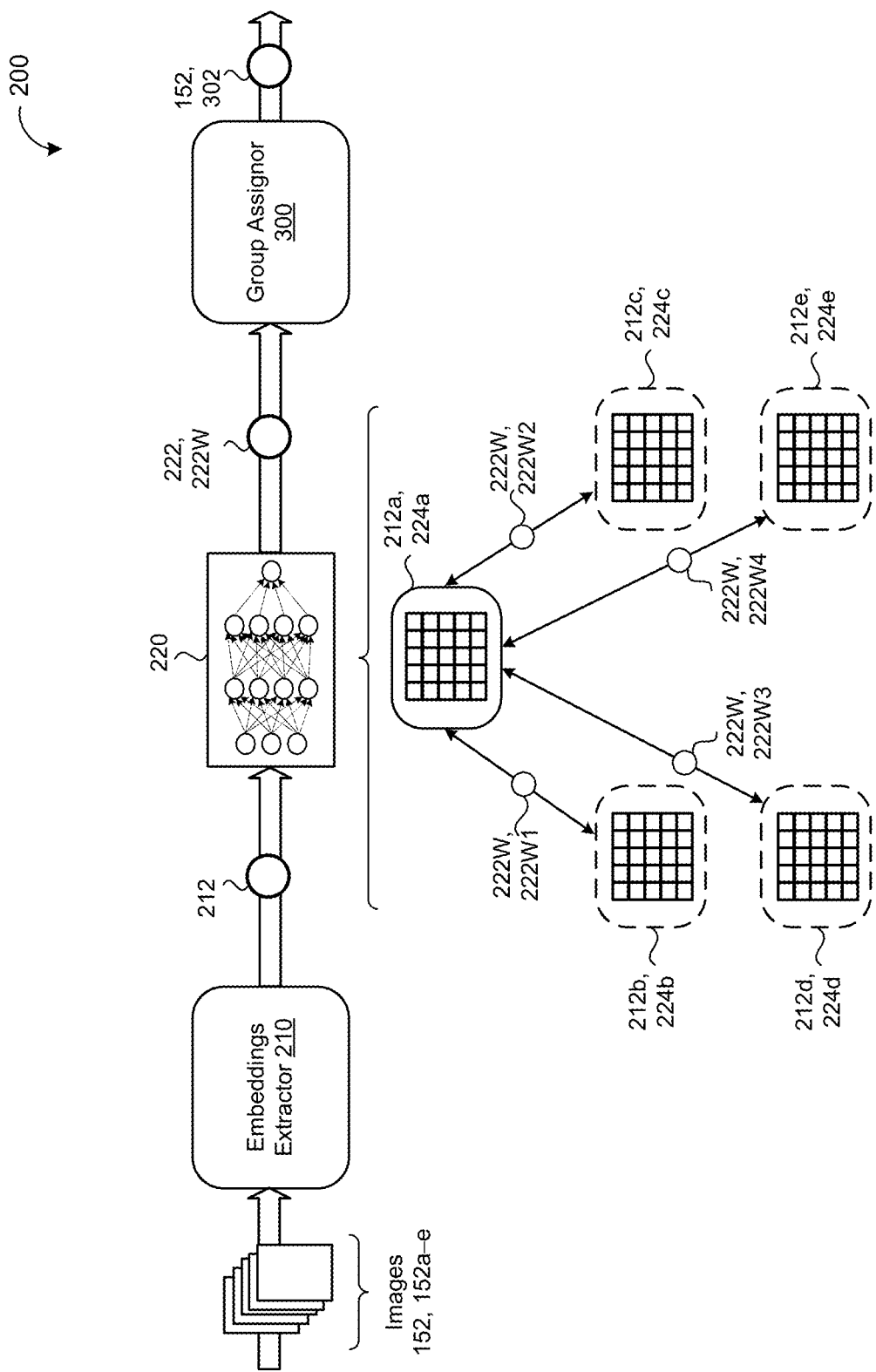
FIG. 2 is a schematic view of an example image clustering anomaly detector.

Referring now to FIG. 2, in some implementations, the anomaly detector 200 may receive the plurality of images 152, 152a-e including five (5) images 152. For example, the five (5) images 152 may correspond to the images shown in FIG. 4. The plurality of images 152 may include any number of images 152 and correspond to any type of images (e.g., medical images, images of manufactured cables, images of manufactured tiles, etc.). The plurality of images 152 may be included in the anomaly clustering request 20 (FIG. 1) or may be retrieved from the data store 150 (FIG. 1). The embeddings extractor 210 receives the plurality of images 152 represented by $X = \{x_i \in \mathbb{R}^{W \times H \times 3}\}$.

Figure 4:
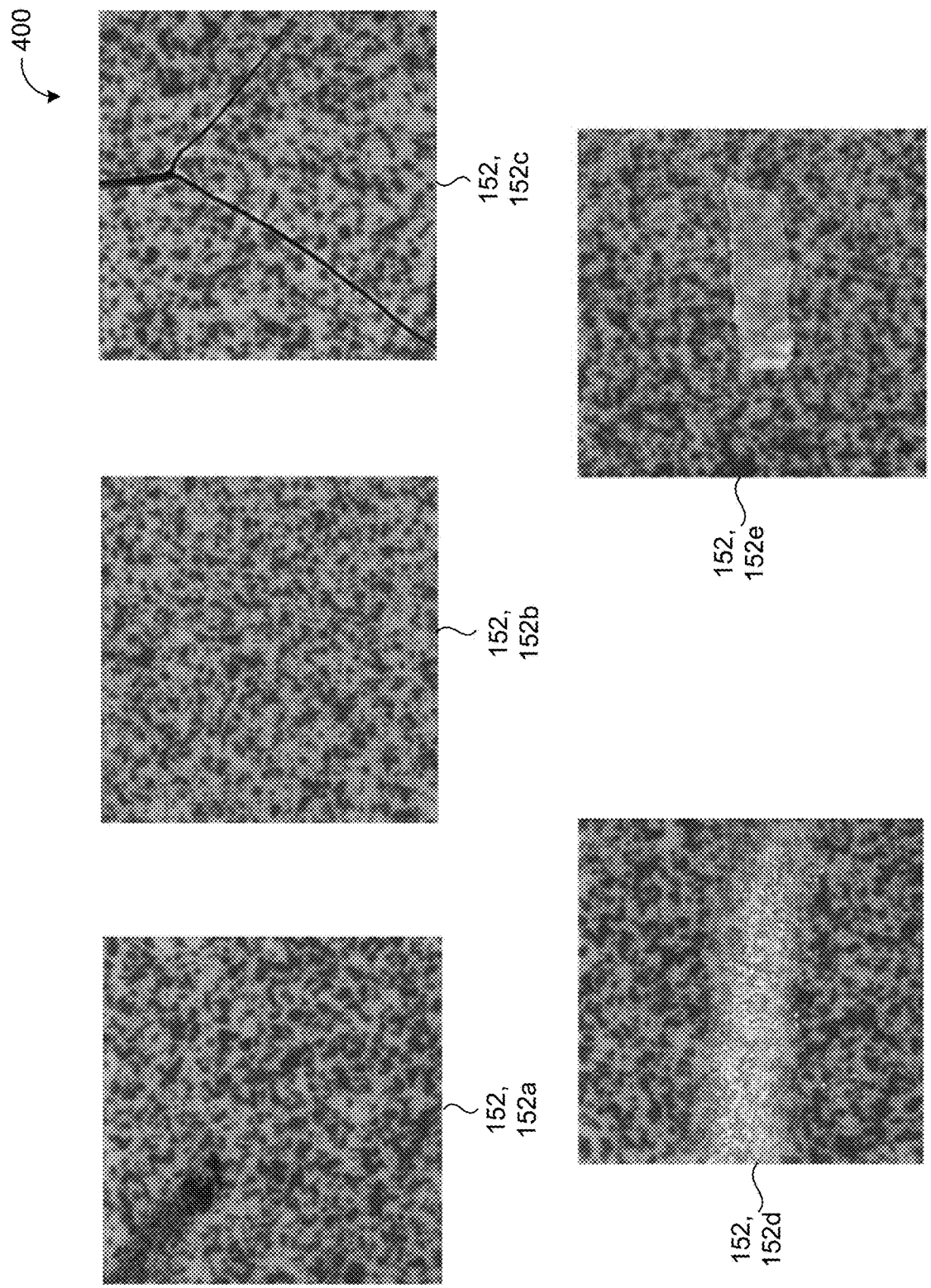
FIG. 4 illustrates an exemplary plurality of images.

FIG. 4 shows a schematic view 400 showing an example plurality of images 152 including five (5) images 152, 152a-e each representing a manufactured tile. Here, each image 152 either represents a tile having a particular defect (e.g., anomaly) type or a tile that does not have any defects (e.g., non-anomalous). For instance, a first image 152a represents a tile having a grey stroke defect. On the other hand, a second image 152b represents a tile not having any defects. Moreover, a third image 152c represents a tile having a crack defect, a fourth image 152d represents a tile having a roughness defect, and a fifth image 152e represents a tile having a glue strip defect.

Referring back to FIG. 2, for each respective image 152 of the plurality of images 152, the embeddings extractor 210, in some implementations, extracts a respective set of patch embeddings 212 from the respective image 152 according to:

$$Z_i \stackrel{\Delta}{=} Z(x_i) = \{z_1^i, \ldots, z_M^i\}, z_m^i \in \mathbb{R}^D \quad (1)$$

In Equation (1), $Z_i$ represents the set of patch embeddings 212 that corresponds to a respective one of the plurality of images 152. Moreover, each patch embedding 212 in the set of patch embeddings 212 corresponds to a localized area of the respective image 152. Thus, as shown in FIG. 2, each set of patch embeddings 212 may be represented by a matrix of patch embeddings 212 having N columns of patch embeddings 212 and M rows of patch embeddings 212. Advantageously, the anomaly detector 200 may determine a localized area within the respective image 152 having an anomaly using the set of patch embeddings 212 because each patch embedding 212 corresponds to a localized area of the respective image 152. In contrast, extracting a holistic representation from each image 152 would not allow such localized anomaly detection.

The neural network model 220 is configured to receive the set of patch embeddings 212 extracted by the embeddings extractor 210 for each image 152 of the plurality of images 152. The neural network model 220 is further configured to determine, for each respective set of patch embeddings 212, a distance 222 between the respective set of patch embeddings 212 and each other set of patch embeddings 212 for the other images 152 in the plurality of images 152. The distance 222 between the respective set of patch embeddings 212 and each other set of patch embeddings may include a Euclidean distance. In some implementations, determining the distance 222 includes aggregating each patch embedding 212 in the set of patch embeddings 212 into a single embedding representation and determining the distance 222 using the single embedding representations of each set of patch embeddings 212. In some implementations, determining the distance 222 includes determining a respective distance 222 between each corresponding patch embeddings 212 in the sets of patch embeddings 212 and aggregating all of the respective distances 222 to generate an aggregated distance. In some instances, the neural network model 220 may be a pretrained neural network model. Optionally, the neural network model 220 resides at the embeddings extractor 210 such that the neural network model 220 and the embeddings extractor 210 may be represented as a single model (not shown).

Notably, not every patch embedding 212 in the set of patch embeddings 212 should equally contribute in determining the distance 222 between sets of patch embeddings 212 because not all patch embeddings 212 include anomalies. That is, the plurality of images 152 may not be object-centered whereby each image 152 is mostly similar to each other image 152 except for a localized area (e.g., a patch embeddings 212) of the image 152. Accordingly, patch embeddings 212 that are likely to include an anomaly should be contribute more to the distance 222 determination between sets of patch embeddings 212. On the other hand, patch embeddings 212 that are not likely to include an anomaly and are similar to patch embeddings 212 of other images should contribute less to the distance 222 determination.

Thus, the neural network model 220 may process the set of patch embeddings 212 to determine a corresponding weight vector (e.g., soft weight vector) 224 for each patch embedding 212 in the set of patch embeddings 212. Here, the corresponding weight vector 224 includes a respective weight 224 associated with each respective patch embedding 212 in the set of patch embeddings 212. Moreover, each respective weight 224 of the weight vector 224 indicates a likelihood that the respective patch embedding 212 includes (or does not include) an anomaly. Alternatively, each respective weight 224 may represent a defectiveness of the respective patch embedding 212. The neural network model 220 may determine the weights 224 using the following equation:

$$\alpha_m^i \propto \exp\left(\frac{1}{\tau}\mathbb{E}_{j \neq i}\left\{\min_n \|z_m^i - z_n^j\|\right\}\right) \quad (2)$$

In Equation (2), $\alpha$ represents the weight vector 224 and $\tau$ controls a smoothness of the weight vector 224. The user 12 (FIG. 1) may specify a value of t (e.g., via the user device 10) to control the smoothness of the weight vector 224. Thus, when $\tau \to 0$, the neural network model 220 generates the weight vector 224 having weights 224 clustered around a single (or multiple) patch embedding 212 in the set of patch embeddings 212. On the other hand, when $\tau \to \infty$, the neural network model 220 distributes the weights 224 of the weight vector 224 across all patch embeddings 212 in the set of patch embeddings 212. The min operator of Equation (2) identifies most similar patch embeddings 212 between sets of patch embeddings 212 and down-weights these similar patch embeddings 212 when determining the weight vector 224. Moreover, $\mathbb{E}_{j \neq i}$ in Equation (2) represents an aggregation of minimum distances. In some examples, however, Equation (2) may replace $\mathbb{E}_{j \neq i}$ with $\max_{j \neq i}$ or $\min_{j \neq i}$. As such, determining the weight vector 224 allows the weight vector 224 to either be centralized for a single patch embedding 212 or be distributed more evenly across all patch embeddings 212. Advantageously, Equation (2) does not limit the weight vector 224 determination to centralizing the weights 224 of the weight vector 224 for a single patch embedding 212 unlike the Hausdorff distance determination which only focuses on a single patch embedding 212 in the set of patch embeddings 212.

In some implementations, determining the distance 222 between the respective set of patch embeddings 212 and each other set of patch embeddings 212 includes determining a weighted average distance 222, 222W between each set of patch embeddings 212. The neural network model 220 determines the weighted average distances 222W based on the distance 222 between sets of patch embeddings 212 and the weight vectors 224 corresponding to the sets of patch embeddings 212. That is, in some examples, the neural network model 220 may aggregate each patch embedding 212 in the set of patch embeddings 212 into the single embedding representation based on the weight vector 224. Thereafter, the neural network model 220 determines the weighted average distance 222W between the respective set of patch embeddings 212 and other sets of patch embeddings 212 using the single embedding representations. Here, the neural network model 220 determines the weighted average distance 222W based on the weight vector 224 corresponding to each patch embedding 212 represented by:

$$d_{WA}(Z_i, Z_j) = \left\|\left(\sum_{m=1}^{M}\alpha_m^i z_m^i\right) - \left(\sum_{n=1}^{M}\alpha_n^j z_m^j\right)\right\| \quad (3)$$

In Equation (3), $d_{WA}$ represents the weighted average distance 222W, $\alpha \in \Delta^M$ represents the weight vector 224, and j indexes feature maps (e.g., hierarchy levels).

As shown in FIG. 2, the neural network model 220 generates a corresponding weight vector 224, 224a-e for each of five sets of patch embeddings 212, 212a-e and determines a weighted average distances 222W between a first set of patch embeddings 212a (e.g., respective patch embeddings 212) and each other set of patch embeddings 212b-e. In the example shown, the neural network model 220 determines weighted average distances 222, 222W1-4 between the first set of patch embeddings 212a (e.g., respective set of patch embeddings 212) denoted by the solid line and each other set of patch embeddings 212b-e (e.g., each other set of patch embeddings 212) denoted by the dashed lines. For example, the neural network model 220 determines a first weighted average distance 222W1 between the first set of patch embeddings 212a including a first weight vector 224a and a second set of patch embeddings 212b including a second weight vector 224b. Notably, patch embeddings 212 in the first set of patch embeddings 212a having a corresponding high weight from the weight vector 224 are weighted more heavily in determining the first weighted average distance 222W1. Similarly, the neural network model 220 determines a second, third, and fourth weighted average distance 222W2-4 between the first set of patch embeddings 212a and a third, fourth, and fifth set of patch embeddings 212, 212c-e, respectively.

In some examples, the neural network model 220 subsamples the weight vectors 224 to reduce the complexity in the determination of weight vectors 224. In particular, a time complexity of distance measures for the weighted average distance 222W is represented by $O(N^2M^2D+N^2D)$ where N indicates a number of images, $N^2M^2D$ indicates weight vectors 224 from Equation (2), and $N^2D$ indicates the weighted average distances 222W from Equation (3). Thus, determining the weighted average distances 222W may be slightly computationally expensive, but the computational expense is negligible for large sets (M) of patch embeddings 212. Importantly, the neural network model 220 may significantly reduce the computational expense of the determining the weighted average distances 222W by subsampling according to:

$$\alpha_m^i \propto \exp\left(\frac{1}{\tau}\mathbb{E}_{z_{sub}^{(i)}}\left\{\min_n \|z_m^i - z_n^j\|\right\}\right) \quad (4)$$

FIG. 2 only shows the neural network model 220 determining weighted average distances 222W between the first set of patch embeddings 212a and each other set of patch embeddings 212b-e for the sake of clarity only. That is, the neural network model 220 also determines weighted average distances 222W for the other set of patch embeddings 212b-e (not shown). For example, the image clustering anomaly detector 200 may determine the weighted average distances 222W between the second set of patch embeddings 212b and each other set of patch embeddings 212a,c-e.

The group assignor 300 is configured to receive the distances 222 (e.g., weighted average distances 222W) from the neural network model 220 and assign each respective image 152 to one of the groups 302 based on the distances 222. For instance, the group assignor 300 assigns the first image 152a to one of the plurality of groups 302 based on the weighted average distance 222W1-4. In particular, the group assignor 330 applies a distance-based clustering technique to assign each respective image 152 into one of the plurality of groups 302.

In some implementations, each image 152 of the plurality of images 152 is unlabeled. That is, each image 152 is not paired with any corresponding label indicating whether the image 152 includes an anomaly or a type of anomaly if one is present in the image 152. In these implementations, the anomaly detector 200 trains in an unsupervised fashion using the plurality of images 152 that are unlabeled. Thus, in these implementations, the neural network model 220 is an unsupervised model that determines the distance 222 between respective set of patch embeddings 212 and each other set of patch embeddings 212. In some examples, each image 152 of the plurality of images 152 is labeled. That is, each image 152 is paired with a corresponding label indicating whether the image includes an anomaly and/or a type of anomaly if one is present in the image 152. Here, the anomaly detector 200 trains in a semi-supervised fashion using the plurality of images 152 that are labeled. Thus, in these examples, the neural network model 220 is a semi-supervised model that determines the distance 222 between respective set of patch embeddings 212 and each other set of patch embeddings 212.

More specifically, semi-supervised training trains the anomaly detector 200 (e.g., the neural network model 220) to accurately determine weight vectors 224 for each set of patch embeddings. That is, the neural network model 280 may receive labeled non-anomalous (e.g., normal) data and determine weight vectors 224 represented by:

$$\alpha_m^i \in \exp\left(\frac{1}{\tau} \min_{z \in Z^{tr}} \left\| z_m^j - z \right\| \right) \quad (5)$$

In Equation (5), $Z_{tr} = U_{x \in X_{tr}} Z(x)$ represents a union of patch embeddings 212 of the non-anomalous data $x \in X_{tr}$. Training the neural network model 280 using the limited amount of labeled non-anomalous data may significantly improve the accuracy of the anomaly detector 200 during inference.

Figure 3:
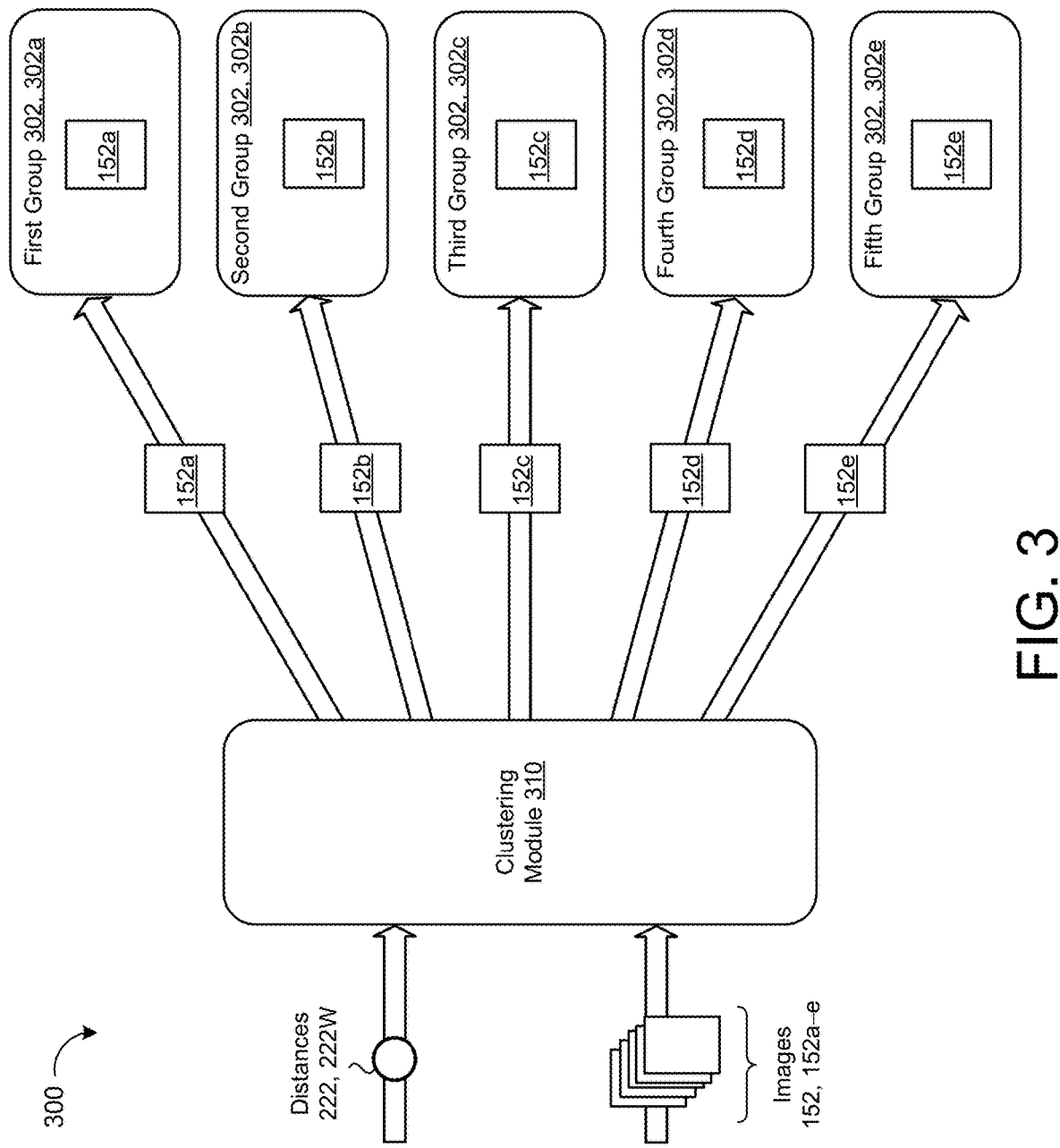
FIG. 3 is a schematic view of an example group assignor assigning each respective image into one of a plurality of groups.

Referring now to FIG. 3, in some implementations, the group assignor 300 includes a clustering module 310. The clustering module 310 assigns each image 152 into one of the plurality of groups 302 by applying a distance-based clustering technique including hierarchical clustering or spectral clustering. As shown in FIG. 3, a first group 302, 302a represents images with grey stroke anomalies, a second group 302, 302b represents images without any anomalies, a third group 302, 302c represents images with crack tile anomalies, a fourth group 302, 302d represents images with a roughness anomaly, and a fifth group 302, 302e represents images with a glue strip anomaly. The clustering module 310 receives the plurality of images 152 and the distances 222 (e.g., weighted average distances 222W) associated with each of the plurality of images 152 and assigns each respective image 152 to one of the plurality of groups 302.

In the example shown, the clustering module 310 receives the plurality of images 152a-e corresponding to the example plurality of images 152 shown in FIG. 4. Thus, based on weighted average distances 222W1-4 (FIG. 2) corresponding to the first image 152a, the clustering module 310 assigns the first image 152 to the first group 302 by applying the distance-based clustering technique of hierarchical clustering or spectral cluttering. Notably, the first image 152 represents a tile having a grey stroke defect and the clustering module 310 correctly assigns the first image 152 to the first group 302a representing images with grey stroke anomalies. Moreover, the clustering module 310 also correctly assigns the second, third, fourth, and fifth images 152b-e to the second, third, fourth, and fifth groups 302b-e, respectively.

Accordingly, the implementations of the anomaly detector 200 described above detect whether images 152 have (or do not have) an anomaly and assigning each respective image 152 into groups 302 based on a type of detected anomaly. The anomaly detector 200 assigns the images 152 into groups 302 by determining average weighted distances 222 between sets of patch embeddings 212. The average weighted distances 222 are weighted more heavily for patch embeddings 212 that are more likely to include anomalies or indicate a greater defectiveness (e.g., indicated by the weight vector 224). Notably, assigning images into different groups 302 based on anomaly type may assist users in root-causing an issue associated with a particular anomaly without having to sort through data associated with anomalies different from the particular anomaly. In other instances, once a group 302 for a particular anomaly type has a sufficient number of images 152, the group 302 may be used as a training data set to train neural network models specifically for the particular anomaly type.

Figure 5:
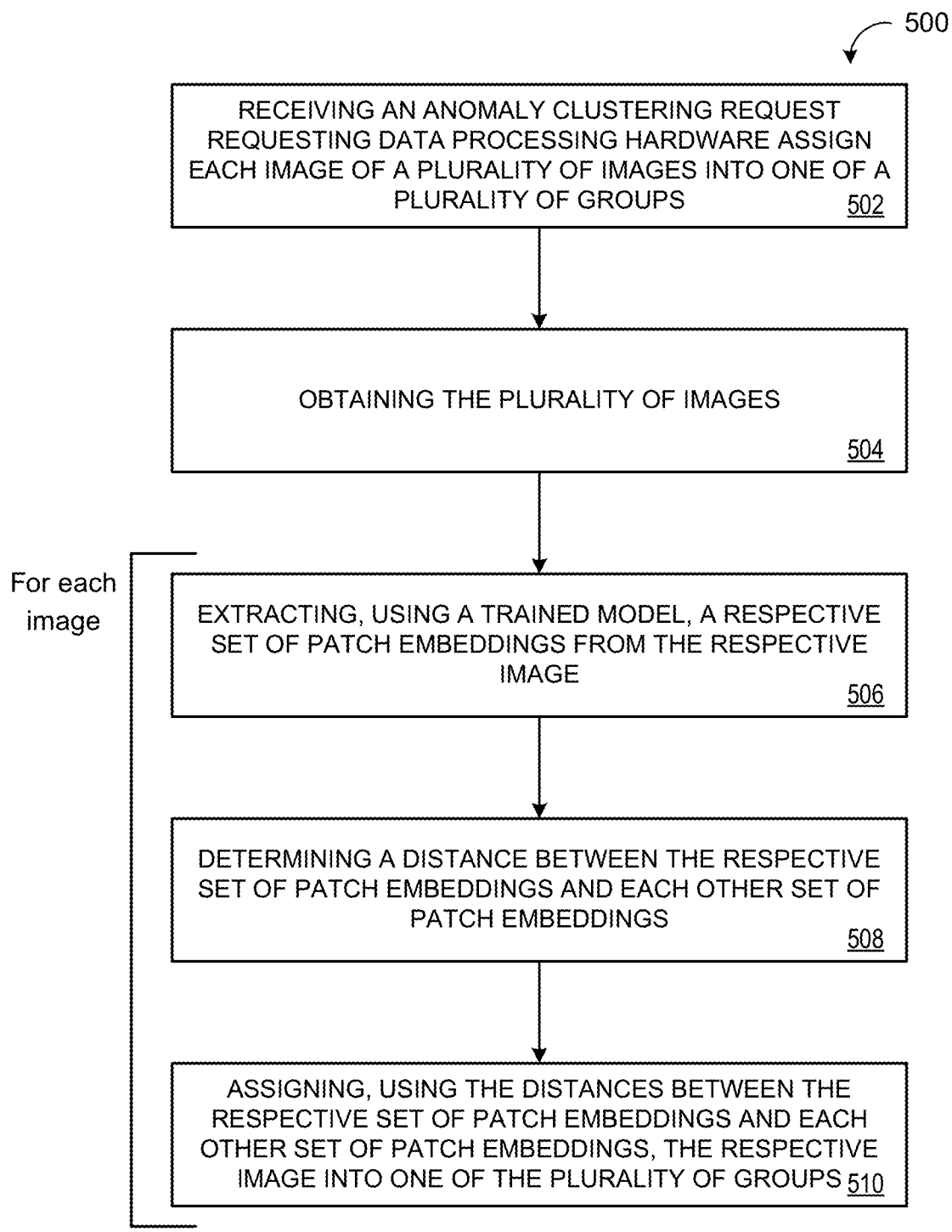
FIG. 5 is a flowchart of an example arrangement of operations for a method of clustering images for anomaly detection.

FIG. 5 is a flowchart of an example arrangement of operations for a method 500 for clustering images for anomaly detection. The method 500 includes, at operation 502, receiving an anomaly clustering request 20 requesting that the data processing hardware 144 assign each image 152 of a plurality of images 152 into one of a plurality of groups 302. At operation 504, the method 500 includes obtaining the plurality of images 152. The method 500 performs operations 506-510 for each respective image 152 of the plurality of images 152. At operation 506, the method 500 extracting, using a trained model (i.e., the embeddings extractor 210), a respective set of patch embeddings 212 from the respective image 152. At operation 508, the method 500 includes determining a distance 222 between the respective set of patch embeddings 212 and each other set of patch embeddings 212. The distance 222 may include a weighted average distance 222, 222W using weight vectors 224. At operation 510, the method 500 includes assigning, using the distances 222 between the respective set of patch embeddings 212 and each other set of patch embeddings 212, the respective image 152 into one of the plurality of groups 302. The plurality of groups 302 may include a group 302 for non-anomalous images 152 and one or more groups 302 each associated with a different anomaly type.

Figure 6:
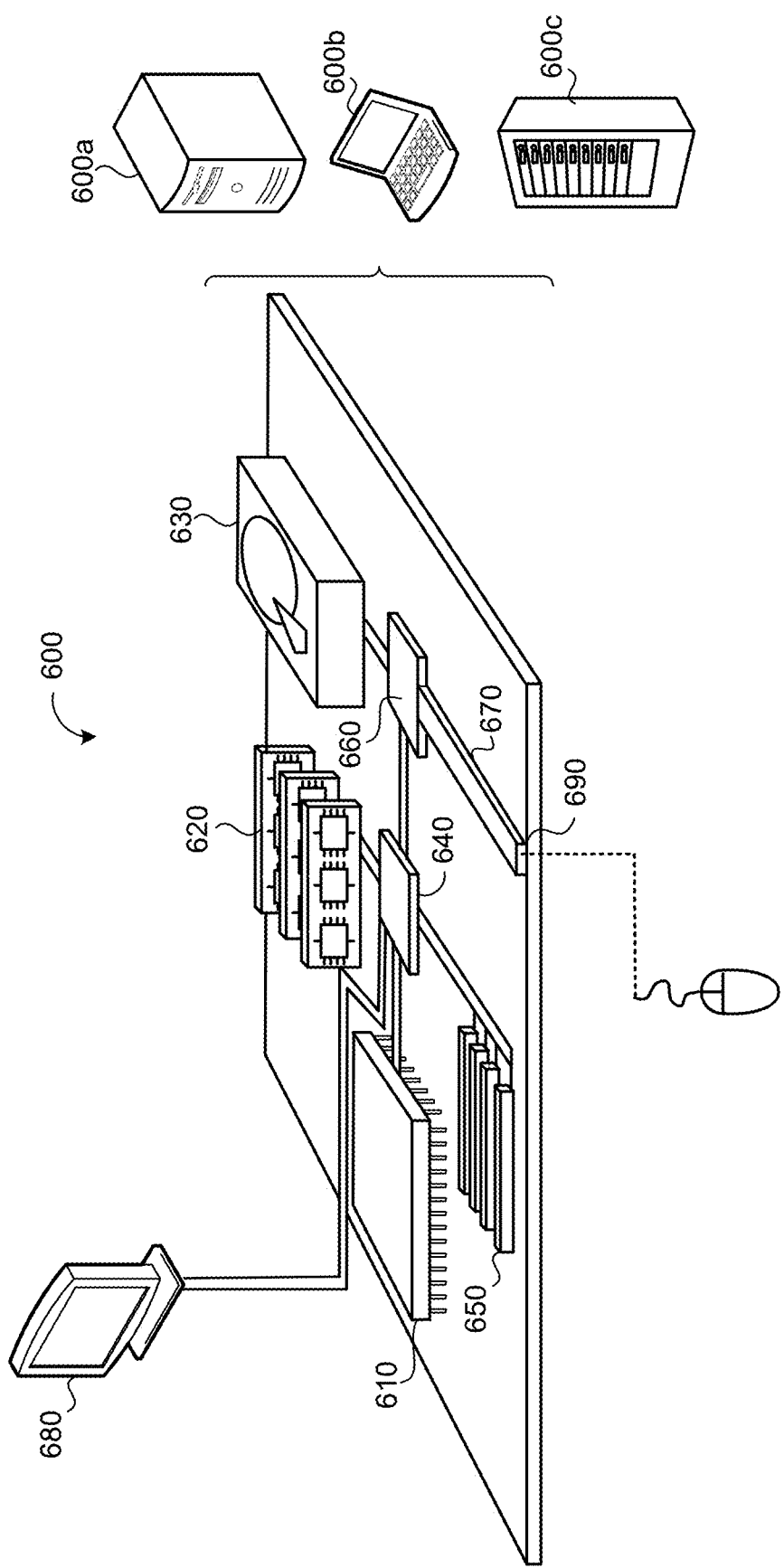
FIG. 6 is a schematic view of an example computing device that may be used to implement the systems and methods described herein.

FIG. 6 is schematic view of an example computing device 600 that may be used to implement the systems and methods described in this document. The computing device 600 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 600 includes a processor 610, memory 620, a storage device 630, a high-speed interface/controller 640 connecting to the memory 620 and high-speed expansion ports 650, and a low speed interface/controller 660 connecting to a low speed bus 670 and a storage device 630. Each of the components 610, 620, 630, 640, 650, and 660, are interconnected using various busses, and may be mounted on a common motherboard or in other manners as appropriate. The processor 610 can process instructions for execution within the computing device 600, including instructions stored in the memory 620 or on the storage device 630 to display graphical information for a graphical user interface (GUI) on an external input/output device, such as display 680 coupled to high speed interface 640. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 620 stores information non-transitorily within the computing device 600. The memory 620 may be a computer-readable medium, a volatile memory unit(s), or non-volatile memory unit(s). The non-transitory memory 620 may be physical devices used to store programs (e.g., sequences of instructions) or data (e.g., program state information) on a temporary or permanent basis for use by the computing device 600. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 630 is capable of providing mass storage for the computing device 600. In some implementations, the storage device 630 is a computer-readable medium. In various different implementations, the storage device 630 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 620, the storage device 630, or memory on processor 610.

The high speed controller 640 manages bandwidth-intensive operations for the computing device 600, while the low speed controller 660 manages lower bandwidth-intensive operations. Such allocation of duties is exemplary only. In some implementations, the high-speed controller 640 is coupled to the memory 620, the display 680 (e.g., through a graphics processor or accelerator), and to the high-speed expansion ports 650, which may accept various expansion cards (not shown). In some implementations, the low-speed controller 660 is coupled to the storage device 630 and a low-speed expansion port 690. The low-speed expansion port 690, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 600a or multiple times in a group of such servers 600a, as a laptop computer 600b, or as part of a rack server system 600c.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method when executed by data processing hardware causes the data processing hardware to perform operations comprising:
   receiving an anomaly clustering request requesting the data processing hardware assign each image of a plurality of images into one of a plurality of groups;
   obtaining the plurality of images; and
   for each respective image of the plurality of images:
     extracting, using a trained model, a respective set of patch embeddings from the respective image;
     determining a distance between the respective set of patch embeddings and each other set of patch embeddings;
     assigning, using the distances between the respective set of patch embeddings and each other set of patch embeddings, the respective image into one of the plurality of groups; and
     determining a weight vector for the respective set of patch embeddings, the weight vector comprising a weight for each patch embedding in the respective set of patch embeddings, each weight indicating a likelihood the patch embedding includes an anomaly.

2. The method of claim 1, wherein assigning the respective image into one of the plurality of groups comprises applying a distance-based clustering technique.

3. The method of claim 2, wherein the distance-based clustering technique comprises one of hierarchical clustering or spectral clustering.

4. The method of claim 1, wherein each image of the plurality of images is unlabeled or labeled.

5. The method of claim 1, wherein determining the distance between the respective set of patch embeddings and each other set of patch embeddings comprises determining a weighted average distance between each set of patch embeddings using the weight vectors corresponding to the respective set of patch embeddings and each other set of patch embeddings.

6. The method of claim 1, wherein the distance between the respective set of patch embeddings and each other set of patch embeddings comprises a Euclidean distance.

7. The method of claim 1, wherein determining the distance between the respective set of patch embeddings and each other set of patch embeddings comprises using an unsupervised model.

8. The method of claim 1, wherein determining the distance between the respective set of patch embeddings and each other set of patch embeddings comprises using a semi-supervised model.

9. The method of claim 1, wherein the plurality of groups comprises at least one of:
   a normalcy group representing images without any anomalies;
   a first anomaly group representing images that comprise a first manufacturing defect; and
   a second anomaly group representing images that comprise a second manufacturing defect.

10. A system comprising:
    data processing hardware; and
    memory hardware in communication with the data processing hardware, the memory hardware storing instructions that when executed on the data processing hardware cause the data processing hardware to perform operations comprising:
      receiving an anomaly clustering request requesting the data processing hardware assign each image of a plurality of images into one of a plurality of groups;
      obtaining the plurality of images; and
      for each respective image of the plurality of images:
        extracting, using a trained model, a respective set of patch embeddings from the respective image;
        determining a distance between the respective set of patch embeddings and each other set of patch embeddings;
        assigning, using the distances between the respective set of patch embeddings and each other set of patch embeddings, the respective image into one of the plurality of groups; and
        determining a weight vector for the respective set of patch embeddings, the weight vector comprising a weight for each patch embedding in the respective set of patch embeddings, each weight indicating a likelihood the patch embedding includes an anomaly.

11. The system of claim 10, wherein assigning the respective image into one of the plurality of groups comprises applying a distance-based clustering technique.

12. The system of claim 11, wherein the distance-based clustering technique comprises one of hierarchical clustering or spectral clustering.

13. The system of claim 10, wherein each image of the plurality of images is unlabeled or labeled.

14. The system of claim 10, wherein determining the distance between the respective set of patch embeddings and each other set of patch embeddings comprises determining a weighted average distance between each set of patch embeddings using the weight vectors corresponding to the respective set of patch embeddings and each other set of patch embeddings.

15. The system of claim 10, wherein the distance between the respective set of patch embeddings and each other set of patch embeddings comprises a Euclidean distance.

16. The system of claim 10, wherein determining the distance between the respective set of patch embeddings and each other set of patch embeddings comprises using an unsupervised model.

17. The system of claim 10, wherein determining the distance between the respective set of patch embeddings and each other set of patch embeddings comprises using a semi-supervised model.

18. The system of claim 10, wherein the plurality of groups comprises at least one of:
- a normalcy group representing images without any anomalies;
- a first anomaly group representing images that comprise a first manufacturing defect; and
- a second anomaly group representing images that comprise a second manufacturing defect.

\* \* \* \* \*